United States Patent
Ahmed et al.

(10) Patent No.: US 7,024,258 B2
(45) Date of Patent: Apr. 4, 2006

(54) SYSTEM AND METHOD FOR MODEL-BASED CONTROL OF A BUILDING FLUID DISTRIBUTION SYSTEM

(75) Inventors: Osman Ahmed, Hawthorne Woods, IL (US); Mark A. Cascia, Barrington, IL (US); James Joseph Coogan, Des Plaines, IL (US); Pankaj Vijay Kalore, Forth Worth, TX (US)

(73) Assignee: Siemens Building Technologies, Inc., Buffalo Grove, IL (US)

(*) Notice: Subject to any disclaimer, the term of this patent is extended or adjusted under 35 U.S.C. 154(b) by 268 days.

(21) Appl. No.: 10/390,069

(22) Filed: Mar. 17, 2003

(65) Prior Publication Data

US 2004/0186599 A1   Sep. 23, 2004

(51) Int. Cl.
G06F 19/00 (2006.01)
G05B 13/00 (2006.01)

(52) U.S. Cl. .................. 700/86; 700/276; 703/2; 165/11.1

(58) Field of Classification Search .............. 700/86, 700/275–278; 702/45, 50, 105, 113, 114; 165/11.1; 236/1 C; 73/1.34, 1.35; 703/2
See application file for complete search history.

(56) References Cited

U.S. PATENT DOCUMENTS

| | | | |
|---|---|---|---|
| 5,479,812 A | 1/1996 | Juntunen et al. | |
| 5,602,758 A * | 2/1997 | Lincoln et al. | 700/276 |
| 5,705,734 A | 1/1998 | Ahmed | |
| 5,769,315 A | 6/1998 | Drees | |
| 5,791,408 A * | 8/1998 | Seem | 165/250 |
| 5,863,246 A | 1/1999 | Bujak, Jr. | |
| 5,875,109 A | 2/1999 | Federspiel | |
| 5,931,227 A | 8/1999 | Graves | |
| 5,951,394 A | 9/1999 | Pariseau | |
| 6,006,142 A * | 12/1999 | Seem et al. | 700/276 |
| 6,134,511 A * | 10/2000 | Subbarao | 703/6 |
| 6,145,751 A | 11/2000 | Ahmed | |
| 6,240,324 B1 | 5/2001 | Preska et al. | |
| 6,430,985 B1 | 8/2002 | Drees | |
| 2002/0082747 A1* | 6/2002 | Kramer | 700/276 |
| 2004/0078742 A1* | 4/2004 | Emek et al. | 714/728 |
| 2004/0148288 A1* | 7/2004 | Haeberle et al. | 707/10 |

* cited by examiner

Primary Examiner—Paul Rodriguez

(57) ABSTRACT

A system and method generates test vectors and a corresponding test program to manipulate terminal units in a building system so pressure and flow measurements correspond to independent modeling equations. The pressure and flow responses of the building system to the test program manipulation may be used to compute loss coefficients for the modeling equations. The modeling equations may then be updated with the computed loss coefficients so a building simulation may be performed. The simulated static pressure response of the modeling equations may be compared to measured static pressures to evaluate the sufficiency of the modeling equations.

19 Claims, 13 Drawing Sheets

SYSTEM AND METHOD FOR MODEL-BASED CONTROL OF A BUILDING FLUID DISTRIBUTION SYSTEM

FIELD OF THE INVENTION

This invention relates to control systems for building systems such as environmental systems and, more particularly, to systems for developing operational parameters for control of fluid distribution systems in buildings.

BACKGROUND OF THE INVENTION

Most commercial properties include a number of building systems that monitor and regulate various functions of the building for the comfort and well-being of the tenants. These building systems include security systems, fire control systems, and elevator systems. One prevalent and important building system is the environmental control system.

An environmental control system is used to regulate the temperature and flow of air throughout a building. The air conditioning for a building typically includes one or more chillers for cooling air and one or more heaters for warming air. Fans distribute air conditioned by a chiller or heater into a duct system that directs the flow of air to the various rooms of a building. Dampers controlled by terminal units are located within the duct system to variably control an opening to a branch of a duct system or to a room. The dampers are maneuvered through a range of movement from being 100% open to 0% open, i.e., closed, by actuators. Also, the speed of a motor that drives a fan is controlled to regulate fan speed and, correspondingly, air flow in the system. An important component of a building environmental system is the control system that varies the fan motor speed and the position of the various dampers to maintain pressure and flow rate set points for the system.

Control systems for building systems are increasingly reliant upon computer and network technology. Microcontrollers and the like may be used to operate and maintain actuators for damper position as well as controlling fan speed. These local controllers provide operational data to an overall system controller. The overall system controller is typically a computer that analyzes data received from local controllers to determine whether system parameters, such as set points, are being maintained. If the system parameters are not being met, the system controller issues command messages to one or more local controllers to adjust local control so the system parameters may be achieved. In some previously known systems, the system controller communicates with the local controllers over a computer network. Most typically, the hardware platform for the network is an Ethernet platform and the network software supporting communication over the network is a TCP/IP layer. This structure supports communication between a control application program executing on the system controller and an application program executing on the local controller.

In order to monitor a building system, a system controller typically receives status data from sensors, such as flow sensors, coupled to local controllers or terminal units. These data may be compared by the system controller to the system parameters or set points to determine the control actions required to bring the system into compliance with the system set points. One type of environmental system is a variable air volume (VAV) system. In an exemplary VAV system, such as the one shown in FIG. 1, outside air is drawn into system 10 through an outside damper 14, filtered through filter 18, and warmed, if necessary, by heating coil 20. A single or dual fan 24 pushes the air through cooling coil 28 for cooling, if required, and filtered again by filter 30 before being supplied to terminal units 32a, 32b, 32c, 32d, and 32e for distribution through diffusers 34 to zones serviced by the terminal units. Terminal units 32a–32e typically supply air at a constant temperature of 15 degrees Celsius for cooling and 22 degrees Celsius for heating. A fan controller regulates the speed of fan 24 to generate adequate pressure to overcome the resistance provided by the coils, filters, air ducts, and dampers. Typically, the pressure set point used by the fan controller to regulate the fan speed corresponds to an arbitrary location that is generally two-thirds of the distance to the terminal unit that is farthest downstream from the fan. This pressure may be sensed by a static pressure sensor 38. The pressure sensed at this location varies as the flows to the various zones change in response to thermal requirements detected for a zone. The fan controller uses the sensed static pressure to either modulate the fan speed or adjust the position of the outside damper to maintain the fixed pressure set point.

Consumption of electrical energy by fans in heating, cooling, and ventilation (HVAC) systems is significant. According to a 1999 Department of Energy report, central VAV fans in commercial buildings in the United States consume 62.7 billion kWh. If this electrical energy usage could be reduced, not only would the operators of the building systems see a financial savings but the amount of pollutants generated during the production of electrical energy would be lowered as well. Thus, there is a private and a public benefit in reducing the amount of electrical energy consumed by the operation of building system, such as a HVAC system.

One way to reduce building HVAC electrical power consumption is by delivering airflow at a fraction of maximum capacity when a lower airflow rate is required to satisfy only a fraction of the maximum space cooling or heating energy demand. This is usually achieved by modulating the fan speed of a central air handler. Centrifugal fans are the most common type of fan used in central HVAC systems. These fans consume energy in proportion to the product of the airflow rate and fan pressure. Therefore, lowering the airflow rate in this type of HVAC system, commonly called a variable air volume (VAV) system, also reduces electrical energy consumption of the system. Typically, the pressure set point for the arbitrary location located downstream from the fan is usually selected so that the fan is able to supply maximum air flow to all of the zones when they are experiencing system design conditions. However, the zones regulated by the terminal units rarely experience the design conditions. Consequently, the zones typically require only a fraction of the design condition and this means that the pressure set point is significantly higher than what is required for operation of the building system most of the time. The chapter entitled *Automatic Control* in the *ASHRAE Handbook on HVAC Applications*, 1995, states that excessive duct static pressure leads to poor system control, noise, and waste of electrical energy. Hence, there is a need to more effectively determine the pressure set point for controlling the operation of a VAV HVAC system.

The process of installing the components of a HVAC system and initially determining the operational set points is known as commissioning a HVAC system. The ducts, terminal unit, and diffusers that service a zone are sometimes called a branch. A fan typically supplies air to more than one branch. The control signal required for proper regulation of a damper does not necessarily correspond to the expected air flow through a terminal unit but rather the actual air flow through a branch. Thus, commissioning requires measurements of air flows through branches under differing conditions so actual air flows may be used to determine expected air flows for control purposes. The measurements are used to compute flow loss coefficients that correlate the manual flow measurements to the flows measured by a flow sensor located near a damper. The flow loss coefficient is manually entered into the terminal unit so the local controller properly regulates air flow to the zone serviced by the branch. The process of measuring air flows and computing the flow loss coefficient is repeated for each branch supplied by a fan. If there are errors made during the process of computing the initial flow loss coefficients or system configuration changes made, the process must be repeated for each branch. Furthermore, as the system ages, flow loss coefficients for a branch may change without detection. Only during re-commissioning of the system are such changes detected.

To address the need for simplifying the procedure for computing flow loss coefficients, a system was developed for performing a self-commissioning process. This system is described in U.S. Pat. No. 5,705,734 and is commonly owned by the assignee of this patent. The disclosure of the '734 Patent is hereby expressly incorporated by reference. The procedure of the '734 Patent requires a determination of the main supply duct segment flow loss coefficient by measuring fan flow rate at two different terminal unit conditions while holding flow rate through one of the terminal units at a constant rate. Using the flow loss coefficient for the fan supply duct segment and measuring flow and pressure conditions for other terminal unit conditions, the flow loss coefficients for the remaining main duct segments may be computed. Once the flow loss coefficients for the main duct segments are computed, the flow loss coefficient for a terminal unit may be determined by closing all other terminal units and determining the flow through the open terminal unit from the main duct segment flows. This procedure is repeated for each terminal unit. While the method and system of the '734 Patent simplifies the data collection for flow loss coefficient computation, it does rely upon closure of the terminal units other than the one for which the flow loss coefficient is being computed. Terminal unit closure assumes no leakage of air through a closed terminal unit; however, such an assumption is rarely accurate. Also the system and method of the '734 Patent implements a sequential process for determining the flow loss coefficients of duct segments and terminal units.

One proposed solution for determining a fan static pressure set point suggests the use of flow set points for terminal units in an existing system with software for designing duct systems. However, this proposal does not address how existing duct structure information may be collected for use in the solution and duct design software is not conducive for real time applications. Another proposed solution assumes all branches of a system have the same airflow rate and this solution works well for small structures, such as most houses. However, application of that approach to commercial properties does not appear feasible because large systems include multiple main duct segments and each one may have different airflow rates. Another problem with this solution is that it requires a low flow rate through one open terminal while all other terminal units remain closed. Such a condition is difficult to maintain in large building systems.

Another proposed solution requires generation of error signals from the terminal units that are either provided to a proportional integral (PI) controller or a heuristic analysis of the error signals and their changes. However, the handling of the error signals in those systems presented significant issues. Other systems use a trial and error approach of gradually lowering the fan pressure by a fixed amount until a terminal unit asserts a low flow rate alarm condition. Establishing the fan set point at a level that results in a flow rate at one or more terminal units that is barely above its alarm level may inadequately serve a room in a typical commercial building. In a research facility where air flow rate may also be important for safety reasons, such an operating condition is even more likely to be unacceptable. Solutions that rely upon damper position signals rather than pressure or flow rate signals also present issues. In this type of system, the fan rate is gradually increased until one of the terminal units is almost fully opened. However, damper position sensors increase implementation costs and real time position measurements require complex signal processing and data analysis, especially with transient data.

What is needed is a system and method for determining flow loss coefficients and set points for a building system that do not significantly increase implementation costs of HVAC systems.

What is needed is a system and method for determining flow loss coefficients and set points for a building system that do not result in marginally acceptable air flow rates.

What is needed is a system and method for determining flow loss coefficients and set points for a building system that do not require the generation and processing of error signals.

What is needed is a system and method for determining flow loss coefficients and set points for a building system that do not require complex software descriptions of building duct systems.

What is needed is a system and method for determining flow loss coefficients and set points for a building system that is applicable to large building systems.

SUMMARY OF THE INVENTION

The above limitations of previously known systems and methods may be overcome by a system and method implemented in accordance with the principles of the present invention. The inventive system characterizes the distribution system's flow-pressure relationship when all the dampers are fully open. The selection of a system pressure that the fan has to overcome when all the dampers are fully open helps ensure the selected static pressure value is a minimum. Also, the characterization of the pressure model at the damper fully open condition simplifies the model development and implementation The inventive system includes a test vector generator for generating test vectors corresponding to building system test conditions and a building system controller instruction generator for converting the generated test vectors into instructions for operating at least one controller in a building system. The test vector generator of the present invention generates test vectors using random numbers to control flow rates in terminal units so the resulting model equations are independent. The building system controller instruction generator generates controller instructions that operate the terminal units to achieve the test vectors. The generated instructions may then be provided to the operator of a building system and installed in the controllers of the system. The building system may then be operated in accordance with the instructions and measurements of the resulting pressures and/or flows at the terminal units and fan may be obtained for analysis.

The system further includes a flow loss coefficient generator that uses the data collected from measuring the responses of the building system to the generated controller instructions. The flow loss coefficient generator preferably uses a duct layout of the building system, a forcing matrix from the measured pressures, and the independent modeling equations to compute flow loss coefficients for the terminal units. Preferably, the flow loss coefficients are computed using regression analysis and the independent modeling equations. The computed flow loss coefficients may be used to update the building system model equations. The fan flow rates used for the test conditions may then be used to simulate the response of the updated building system model. The results may then be analyzed to determine whether the computed flow loss coefficients accurately simulate the building system. The flow loss coefficients finally selected may then be used to generate set points and controller instructions for the final model of the building system.

The method of the present invention includes generating test vectors corresponding to building system test conditions and converting the generated test vectors into instructions for operating at least one controller in a building system. The test vector generation of the present invention generates test vectors using random numbers to control flow rates in terminal units so the resulting model equations are independent. The building system controller instruction generation produces controller instructions that operate the terminal units to achieve the test vectors. The generated instructions may be installed in the controllers of the building system and the building system may be operated in accordance with the instructions. Measurements of the resulting pressures and/or flows at the terminal units and fan may be obtained for analysis.

The inventive method further includes receiving the data collected from measuring the responses of the building system to the generated controller instructions and using them with a duct layout of the building system to compute flow loss coefficients for the terminal units. Preferably, the flow loss coefficients are computed using regression analysis and the independent modeling equations. The method updates the building system modeling equations with the computed flow loss coefficients. By solving the updated equations for simulated static pressures, the response of the updated building system model may be simulated. The simulated results may be compared to the measured static pressures to determine whether the computed flow loss coefficients produce efficient control of the building system. The flow loss coefficients finally selected may then be used to generate set points and controller instructions corresponding to the final model of the building system.

The present invention is implemented remotely from a central location instead of developing a "shrink-wrapped" software solution for the field locations. In the latter approach, the process of packaging high level mathematical functions and algorithms that are needed for model identification, software training, updates, and maintenance is potentially very challenging. By deploying the entire process of implementation of the proposed invention from a central server, the process is easy to manage and maintain. It also provides consistent outputs to buildings that are geographically distributed. The remote implementation process includes creating specific test vectors for a system, generating test code, simulating the building fluid distribution system, and developing an actual pressure distribution system control algorithm and program.

The system and method of the present invention enable the generation of controller instructions for a building system in an automatic manner.

The system and method of the present invention facilitate the testing of a building system to obtain data for more accurate computation of flow loss coefficients.

The system and method of the present invention provide improved modeling of a building system so more energy efficient control of the building system may be achieved.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

DETAILED DESCRIPTION OF THE INVENTION

Figure 1:
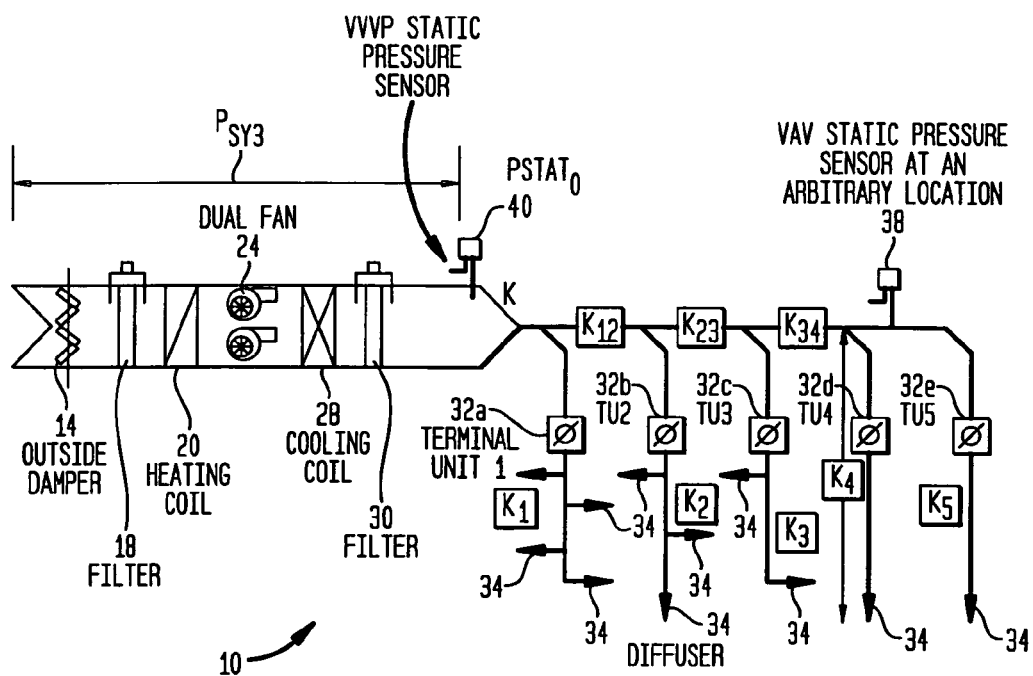
FIG. 1 is a block diagram of a system in which a system and method operating in accordance with the principles of the present invention may be used.

As noted above, an exemplary variable air volume (VAV) system is shown in FIG. 1. Outside air is drawn into system 10 through an outside damper 14, filtered through filter 18, and warmed, if necessary, by heating coil 20. A single or dual fan 24 pushes the air through cooling coil 28 for cooling, if required, and filtered again by filter 30 before being supplied to terminal units 32a, 32b, 32c, 32d, and 32e for distribution through diffusers 34 to zones serviced by the terminal units. Terminal units 32a–32e typically supply air at a constant temperature of 15 degrees Celsius for cooling and 22 degrees Celsius for heating. A fan controller regulates the speed of fan 24 to generate adequate pressure to overcome the resistance provided by the coils, filters, air ducts, and dampers. Typically, the pressure set point used by the fan controller to regulate the fan speed corresponds to an arbitrary location that is generally two-thirds of the distance to the terminal unit that is farthest downstream from the fan.

This pressure may be sensed by a static pressure sensor 38. The pressure sensed at this location varies as the flows to the various zones change in response to thermal requirements detected for a zone. The fan controller uses the sensed static pressure to either modulate the fan speed or adjust the position of the outside damper to maintain the fixed pressure set point. The static pressure at the output of fan 24 is measured by a pressure sensor 40.

With further reference to FIG. 1, the total fan static pressure that fan 24 has to overcome in order to provide zone flows may expressed as: $Pstat_{fan}=P1_{sys}+P1_{duct}+P1_{fittings}+P1_{damper}$. Assuming that the airflow in system 10 is turbulent and fully developed, each pressure loss component may be expressed as $P1=K(flow)^2$. Further assuming that the variation on total static pressure loss caused by duct and fitting loss coefficients variation with flow rate is insignificant and that the damper loss coefficient variation is also insignificant because at least one damper remains fully open during test conditions so fan pressure is at a minimum, the static pressure equation may be rewritten as: $Pstat_{fan}-K_{sys}(flow_{sys})^2=PStat_0=K_{duct}(flow_{duct})^2+K_{fittings}(flow_{fittings})^2+K_{damper}(flow_{damper})^2$. This equation may be applied to every flow path from the fan outlet to a specific damper outlet to describe the pressure loss-flow relationship for system 10 shown in FIG. 1.

For system 10 in FIG. 1, a distinct flow path exists through each of the terminal units to make a total of five flow paths for system 10. Each flow path from the fan outlet includes a one or more duct segments, a terminal unit, and a diffuser. Because flow remains constant in a duct segment, the loss coefficients for various components may be combined and expressed by a single value for a specific duct segment. Furthermore, a terminal unit serves one or more diffusers and the pressure loss after a terminal unit up to a diffuser is relatively small. Hence, the loss coefficient of a terminal unit may be used to describe the loss characteristics of a branch from a duct segment. Applying the rewritten static pressure equation to each of the flow paths shown in FIG. 1 yields the following equations:

$$PStat_{O1}=K_c(Q_c)^2+K_1(Q_1)^2$$

$$PStat_{O2}=K_c(Q_c)^2+K_{12}(Q_c-Q_1)^2+K_2(Q_2)^2$$

$$PStat_{O3}=K_c(Q_c)^2+K_{12}(Q_c-Q_1)^2+K_{23}(Q_c-Q_1-Q_2)^2+K_c(Q_3)^2$$

$$PStat_{O4}=K_c(Q_c)^2+K_{12}(Q_c-Q_1)^2+K_{23}(Q_c-Q_1-Q_2)^2+K_{34}(Q_c-Q_1-Q_2-Q_3)^2+K_4(Q_4)_2$$

$$PStat_{O5}=K_c(Q_c)^2+K_{12}(Q_c-Q_1)^2+K_{23}(Q_c-Q_1-Q_2)^2+K_{34}(Q_c-Q_1-Q_2-Q_3)^2+K_5(Q_5)^2$$

These equations represent the static pressure model for system 10 in FIG. 1. They also define the static pressure requirement at the fan outlet in order to satisfy the flow requirements for the terminal units while keeping the dampers fully open. As each equation represents a flow requirement for a terminal unit, the fan static pressure set point may be calculated as the maximum of the five static pressure requirements. In other words, $PStat_O=Max(Pstat_{O|1}, Pstat_{O|2}, Pstat_{O|3}, Pstat_{O|4}, Pstat_{O|5})$. Thus, the equations above may be used to model the pressure requirements of system 10 and the maximum static pressure point defines the minimum fan pressure required to meet the flow requirements of the terminal units.

In order to define a system of independent equations that may be used to solve for the nine loss coefficients described by the modeling equations listed above, four more independent equations need to be defined for the equation model. By keeping fan speed constant and closing terminal units 32a, 32c, and 32e while maintaining a constant flow rate through terminal units 32b and 32d, two more independent equations may be obtained. Likewise, closing terminal units 32b and 32d and maintaining a constant flow rate through terminal units 32a, 32c, and 32e while fan speed remains constant, provides three more independent equations. With at least nine independent equations, the equation system may be solved to determine values for the nine loss coefficients.

The mathematical system described above may be improved in several aspects. For one, filly closing a terminal unit when static pressure is relatively high may cause damage to the damper actuator. For another, sufficient leakage to affect the loss coefficient calculation may occur at a damper fully closed position. Preferably, a specific air flow rate may be maintained through a terminal unit instead of fully closing it to address these issues. By fully opening the terminal units adjacent to the one through which a specific air flow rate is maintained, equation independence is better ensured. While the nine loss coefficients may be computed from a nine equation system, regression analysis may be used if more than nine equations are determined. The regression method reduces the contribution of erroneous measurements to the computation and also produces average values over a wide range of operating duct flows. Regression analysis may be made possible by selecting n different fan speeds and then fully opening a set of terminal units while maintaining a set of flow points for the remaining terminal units. The various combinations of open and set flow rate terminal units may be used to generate mathematical models having more equations than the number of loss coefficients being computed. This regression system may be described mathematically as: $[PStat_0]_n=[Q^2]_{nxm}[K_m]$ and this equation may be solved as $[K_m]=[PStat_0]_n [Q^2]^{-1}_{nxm}$ to provide the solutions for the loss coefficients.

Figure 2:
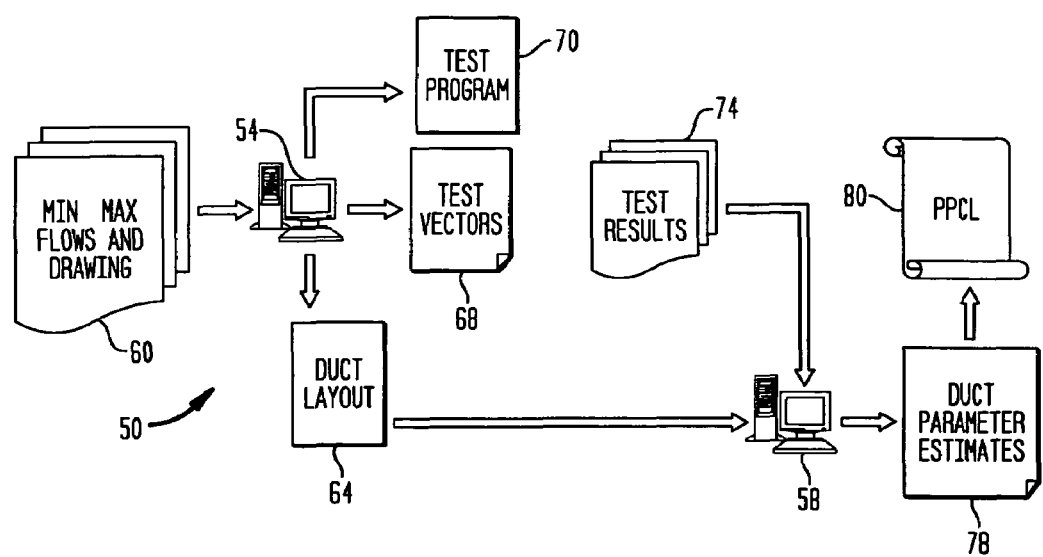
FIG. 2 is a diagram of the components of a system incorporating the principles of the present invention.

A system incorporating the principles of the present invention to implement test conditions for obtaining measurements that may be used to compute loss coefficients and for computing the loss coefficients is shown in FIG. 2. System 50 includes a test vector and test program generator 54 and a loss coefficient generator 58. Test vector/test program generator 54 and loss coefficient generator 58 may be implemented on different computer systems or on the same computer system. An exemplary computer system that may be used to implement generators 54 and 58 may have an Intel Pentium processor operating at 1.8 GHz and supported by 128 MB of RAM and a 40 GB hard drive. Preferably, the computer program(s) that implement test vector/test program generator 54 and loss coefficient generator 58 are written in the Matlab language, although other languages may be used provided they support matrix arithmetic operations. For example, system 50 may be a central platform remotely located from a building for which a model is being developed. The programs herein described for generating test commands, developing system layouts, simulating the system response, and determining the building fluid distribution parameters may be off-the-shelf program tools and algorithms. A process manager may be used to automatically execute the off-the-shelf program tools and algorithms at the remotely located central platform to perform the process shown in FIG. 3. Thus, system 50 may be used to automatically develop an accurate model of a building fluid distribution system for determining a more optimal collection of set-points for building system control.

Test vector/test program generator 54 uses configuration data 60 to generate a duct layout 64 and a set of test vectors

68. Test vectors 68 are also used by test vector/test program generator 54 to generate the controller instructions and set points in a test program 70 that is used for control of a building system to implement test conditions.

Test program 70 may be installed in the controllers of a building system to operate the terminal units in various arrangements of fully opened and constant rate conditions throughout a range of fan speeds. Pressure and flow measurements taken at steady state conditions after a set of damper and fan speed controls have been performed under control of the installed test program, are captured in a test results file 74 for later analysis by loss coefficient generator 58. Test results file 74 and duct layout 64 may be used to define a forcing function matrix and a set of independent equations for regression analysis. Loss coefficient generator 58 executes a program to perform regression analysis and solve for values of the loss coefficients for the duct segments and terminal units. These loss coefficients are then used to generate a new set of modeling equations 78 and the fan static pressure values are inserted into the new modeling equations to obtain simulated flow responses at terminal units in the various test condition scenarios. These simulated results are compared to the measured results to determine the validity of the computed loss coefficients. A human operator may adjust the loss coefficients and run the simulation again to confirm the loss coefficient adjustments. The selected set of loss coefficients for the building system terminal units and the corresponding pressure/flow set points may be implemented in a new building system control program 80.

Figure 3:
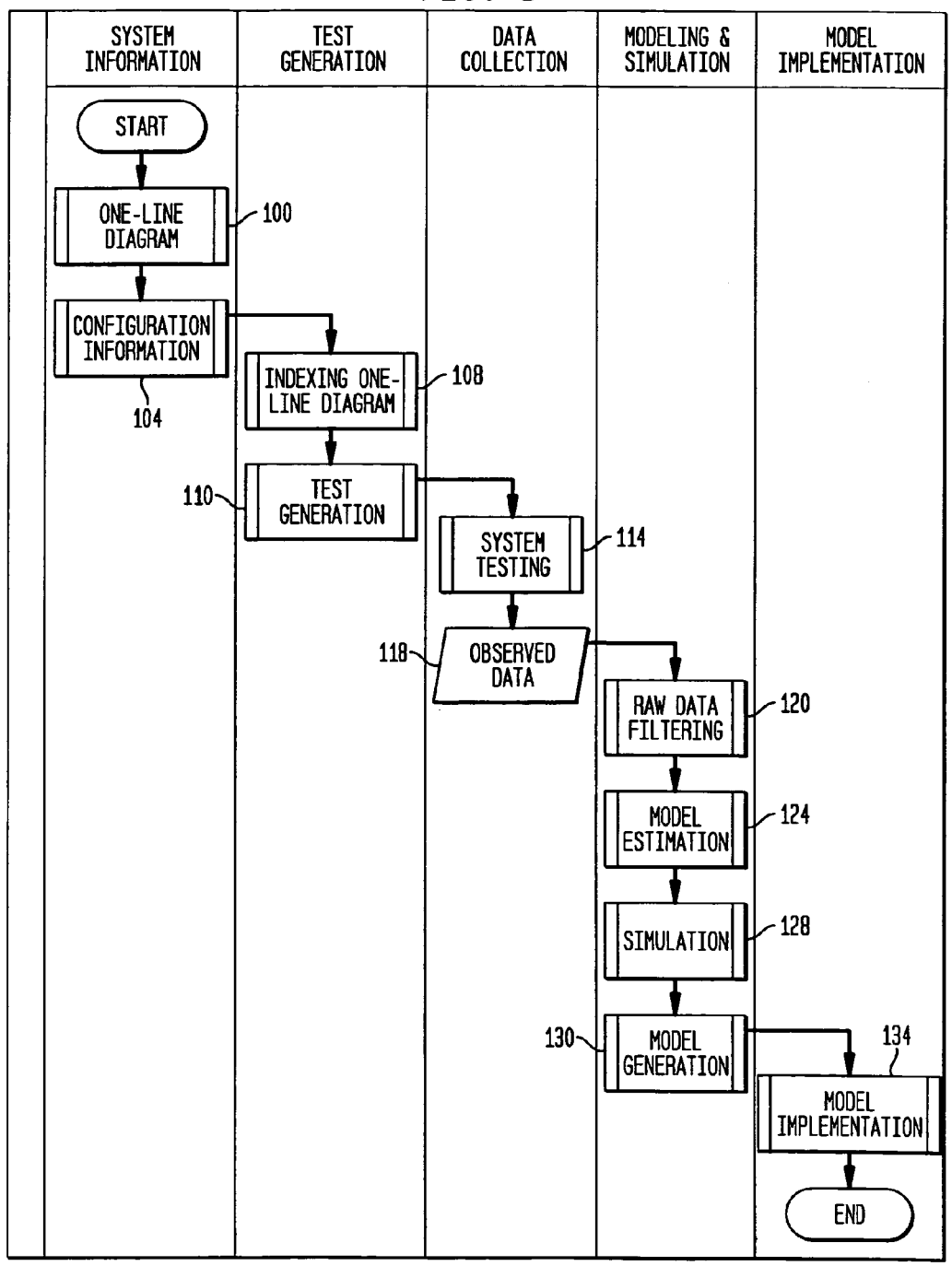
FIG. 3 is a flow chart depicting an exemplary method for implementing the principles of the present invention.

A method implementing the principles of the present invention is shown in FIG. 3. After a one-line diagram depicting the arrangement of components in a building system is drafted (block 100), configuration data 60 are read (block 104). These configuration data include lengths of duct segments, identification of minimum and maximum flow rates through terminal units, as well as other data for the various components of the building system. These data are used to index the one-line diagram to generate a duct layout (block 108). Using this indexed on-line diagram of the building system, test vectors and a test program implementing the test vectors are generated (block 110). The test vectors define which terminal units are open and which ones are controlled to maintain a steady flow rate as the fan is kept at a constant speed. The program is installed in a building system control program and executed to implement the test scenarios corresponding to the test vectors (block 114). The pressure and flow measurements made during the steady states reached after each test scenario is implemented are stored (block 118) and provided to loss flow loss coefficient generator 58 for analysis. The data may be filtered to remove extraneous data provided by the building system control program such as delimiters and other character data (block 120). The equations for the duct layout previously generated are then used to generate a constraint matrix and the measured responses are used to generate a forcing function matrix. The loss coefficients are estimated using these matrices (block 124). The model is updated with the loss flow loss coefficients and the flow rates corresponding to the fan test speeds are used to simulate the response of the building system (block 128). The simulated responses are compared to the measured responses so the computed loss coefficients may be evaluated and adjusted, if necessary. The selected loss coefficients are used to generate the modeling equations for the building system (block 130) and a control program is generated from the new model (block 134) for the control system that operates the building system.

Figure 4:
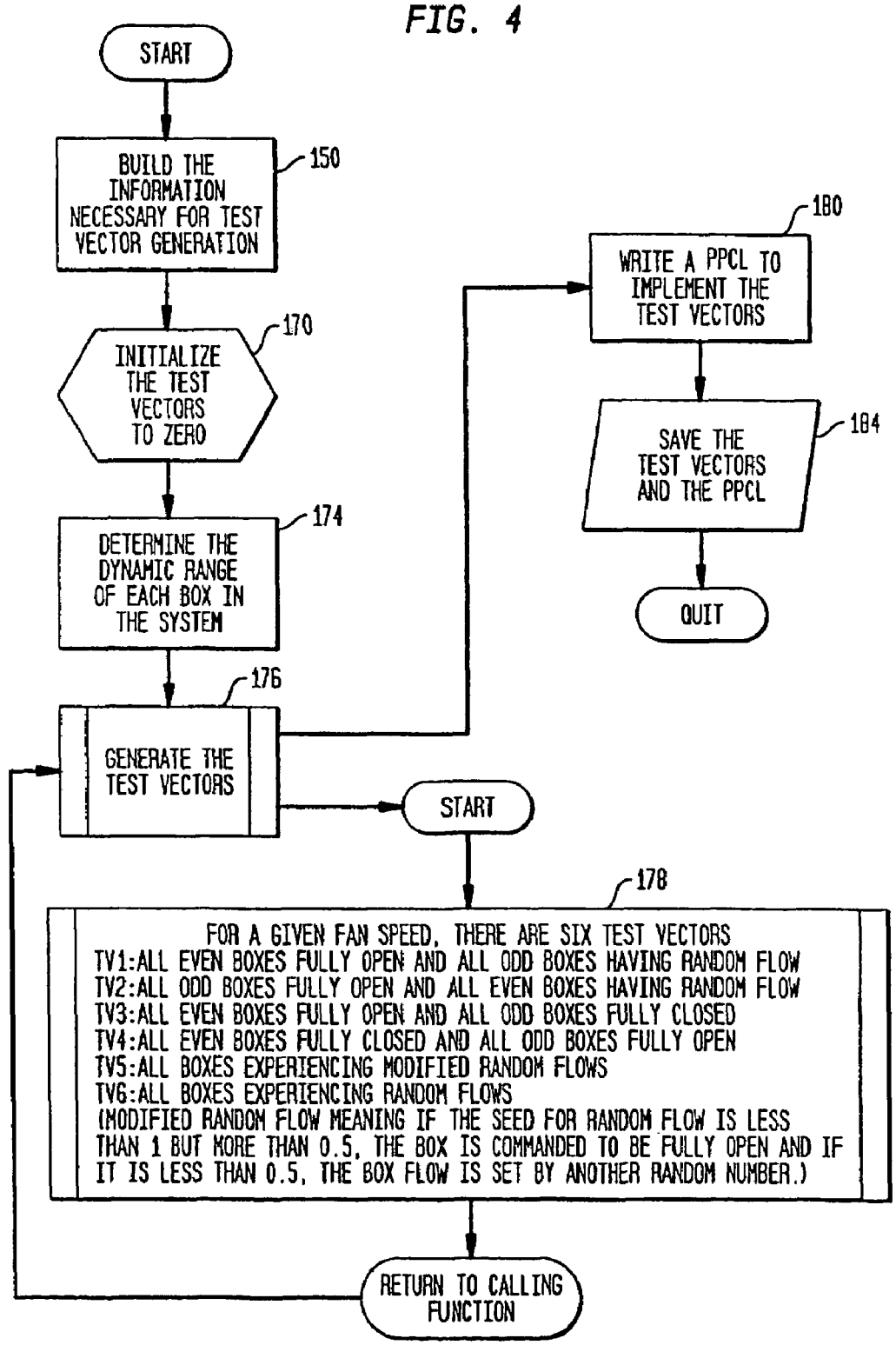
FIG. 4 is a flow chart depicting an exemplary method for generating test vectors in accordance with the principles of the present invention.
Figure 5A:
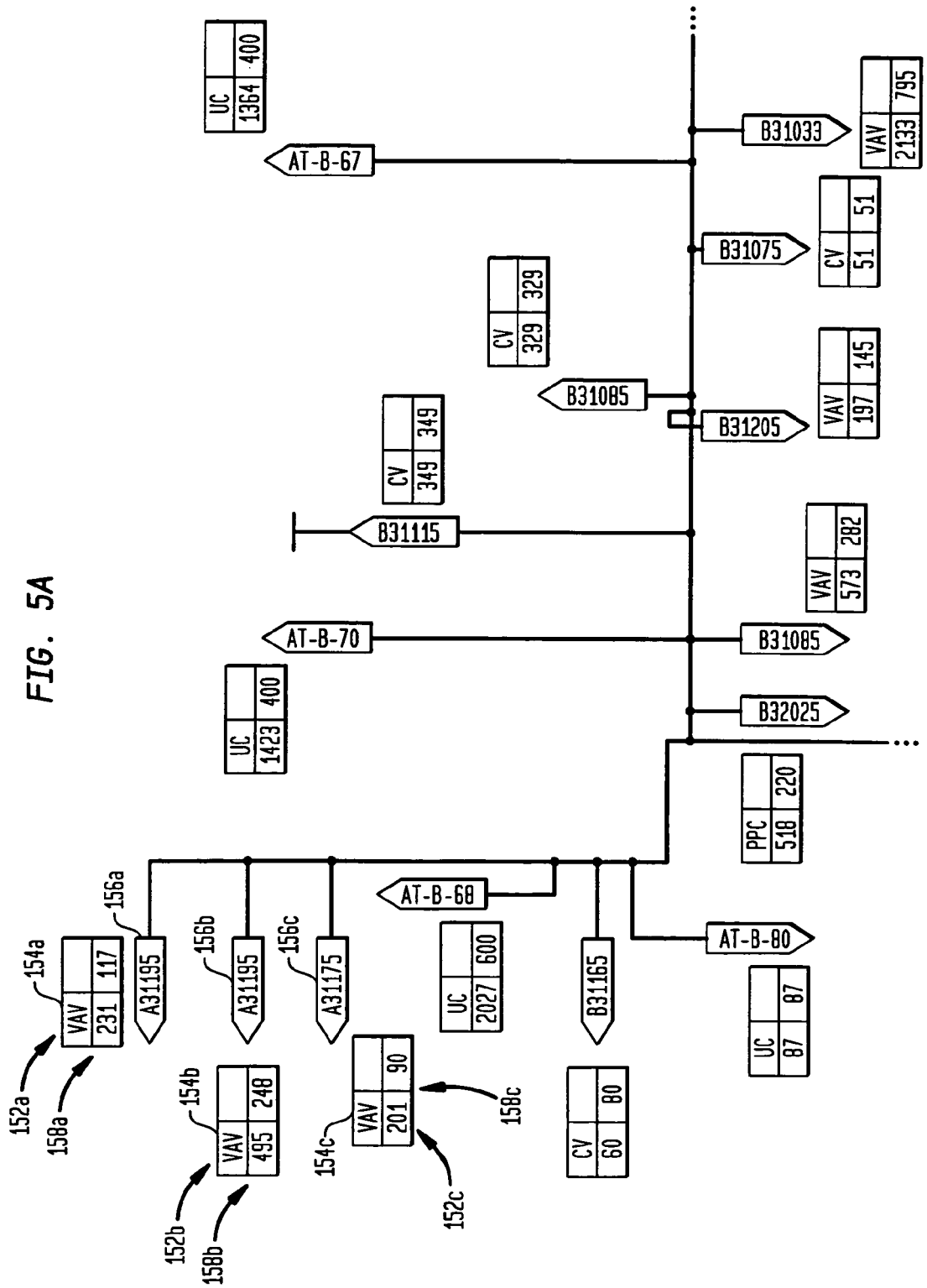
FIGS. 5A–D are a diagram of a duct layout that may be generated by a system implementing the principles of the present invention.
Figure 5B:
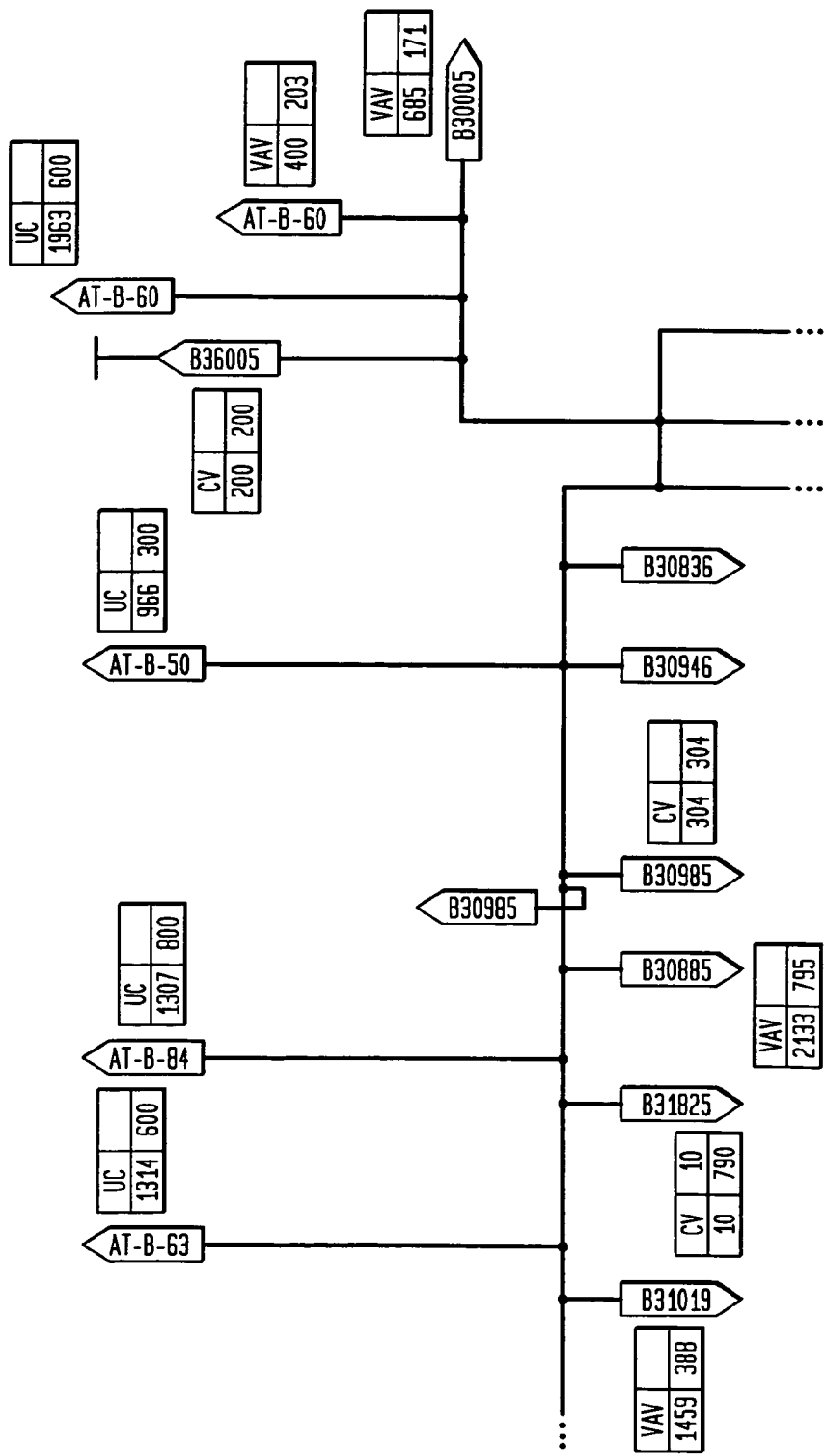
Figure 5C:
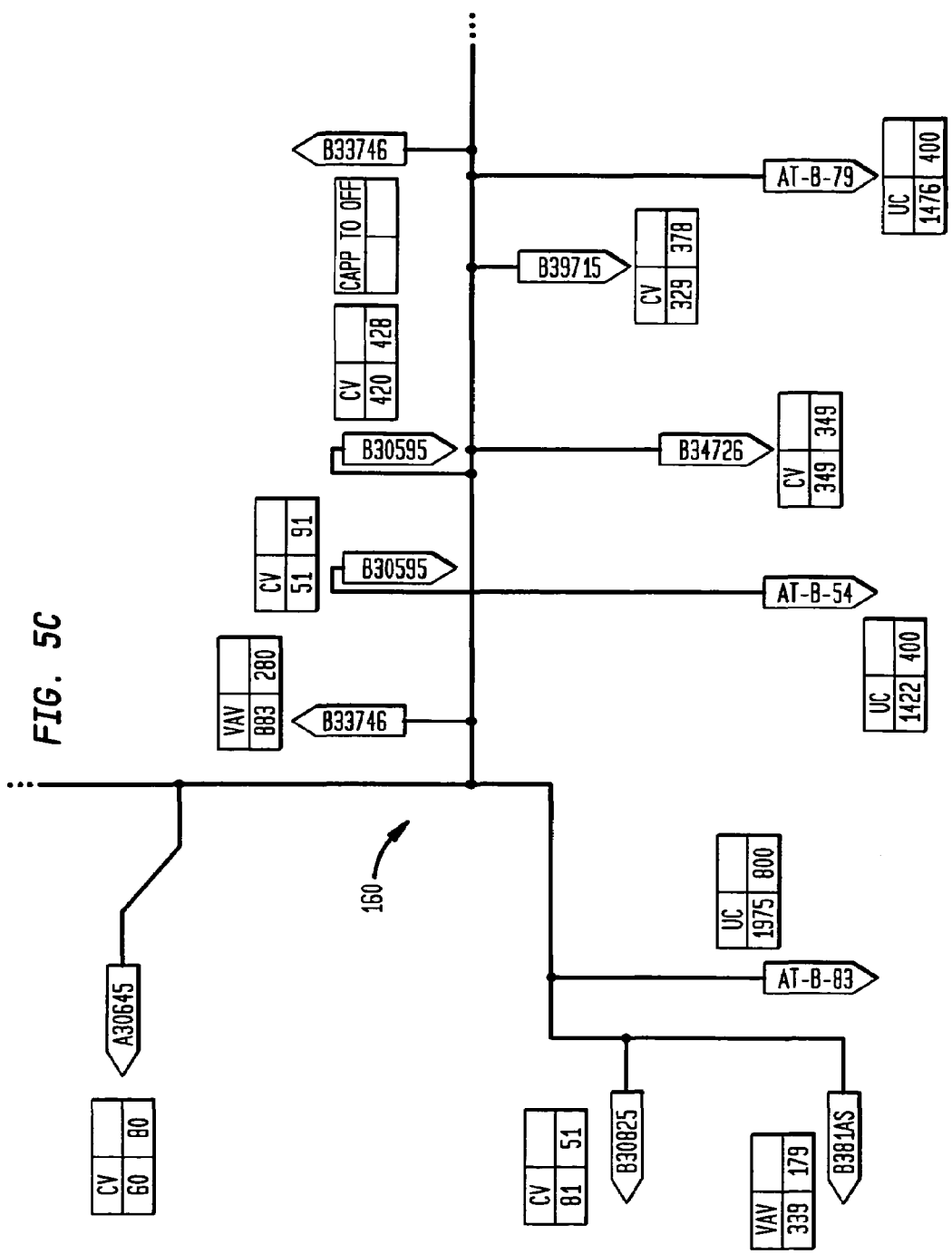
Figure 5D:
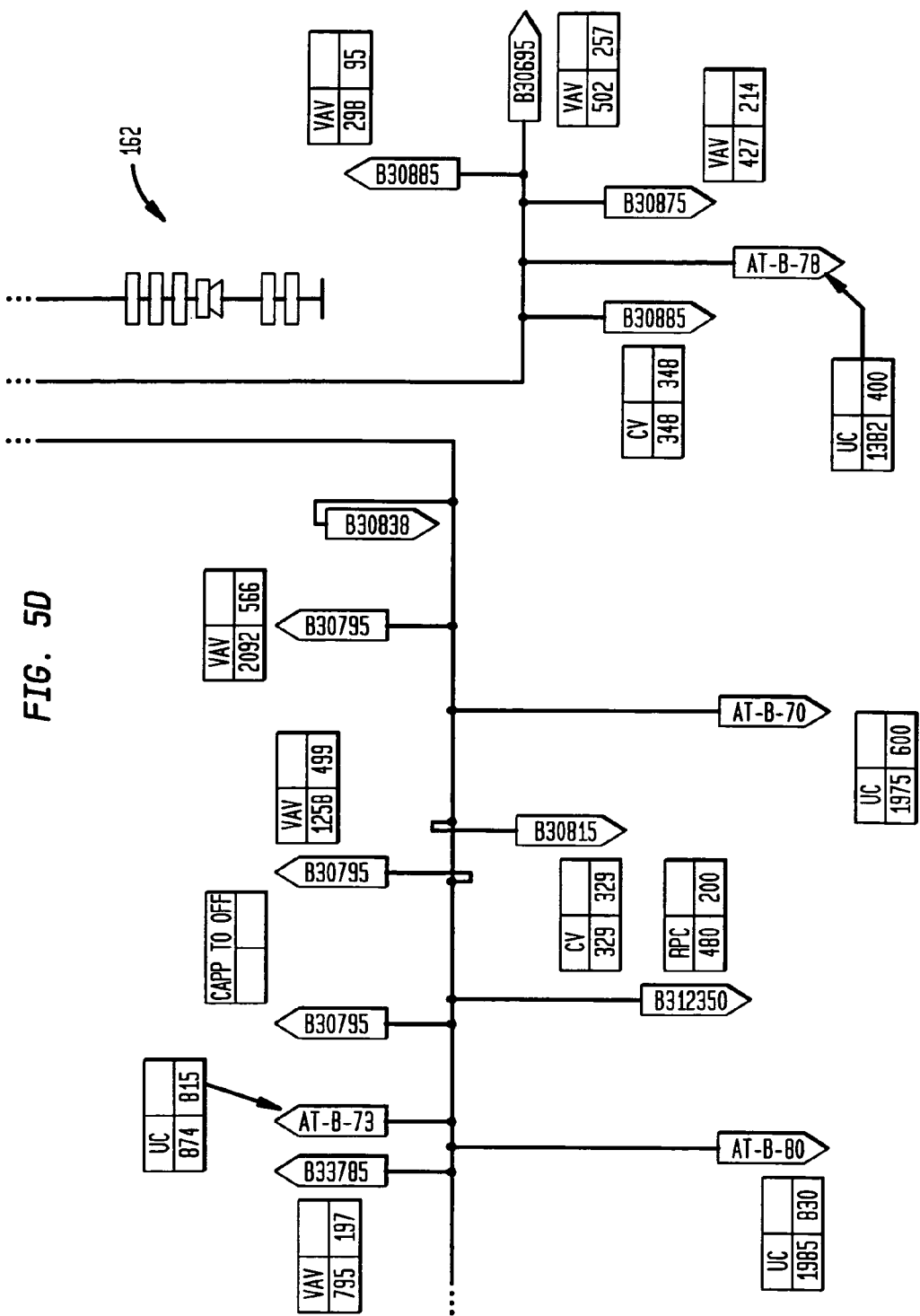

An exemplary method of test generation (block 110, FIG. 3) is shown in more detail in FIG. 4. The test generation method includes building the data required for test vector generation (block 150). These data include identification data for the air handler system being tested, identification data for the terminal units to be tested, names of points in the system, identification of an apparatus type at a point, the minimum air flow through a point, and the maximum air flow through a point. An example of a duct layout chart that may be generated by test vector/test program generator 54 is shown in FIGS. 5A–D. The data shown for the points in the chart are the data that are obtained and organized during the process of information building (block 150). For example, the points 152a, 152b, and 152c in FIG. 5A are variable air volume units identified by the mnemonic VAV 154a, 154b, and 154c. The serial number for each terminal unit handling the variable air volume for these points is identified in the chart at 156a, 156b, and 156c. The minimum and maximum air flows through these units are identified at 158a, 158b, and 158c. Dimensions of the duct work in the system are shown at various locations in the chart such as location 160. Also, fan and other source parameters are identified at 162. These data are required for test vector/test program generation. Dimensions of the duct work in the system are shown at various locations in the chart such as location 160. Also, fan and other source parameters are identified at 162. These data are required for test vector/test program generation.

The exemplary method continues by initializing all test vectors to zero (block 170, FIG. 4). The dynamic range of each terminal unit is computed (block 174) by, for example, subtracting the minimum air flow rate from the maximum flow rate. Test vectors for each fan speed are generated (block 176). This processing is expanded by the accompanying explanation (block 178). For each fan speed, six test vectors may be defined. For the first vector, all of the terminal units with even point identification numbers are commanded to be fully opened while the terminal units with odd point identification numbers are commanded to maintain some constant flow rate. The flow rate is determined by generating a random number and then mapping it to some rate within the computed dynamic range for the corresponding terminal unit. The even/odd differentiation is appropriate because the terminal units are assigned point numbers in consecutive order so that adjacent terminal units do not both have even or odd point numbers. For the second test vector, the odd-numbered terminal units are commanded fully opened while the even-number units are set to maintain a constant flow rate in a similar manner as described above. The third test vector defines all even-numbered terminal units to be fully opened and all odd-numbered units to be fully closed while the fourth test vector commands all even-numbered units to be fully closed and all odd-numbered units to be fully opened. For the fifth test vector, the flow rate is determined by a modified random number. A modified random number is determined by executing the function to obtain a random number in the range of 0 to 1 and comparing it to 0.5. If the random number is less than 0.5, another random number is selected in a smaller sub-interval between 0 and 1. Otherwise, the random number is set to 1. Random numbers are used to help ensure that the data sets are not dependent on one another. If they were, the solution would only be viable for a narrow range of system conditions rather than a wide range. A random flow, as indicated in the exemplary method of FIG. 4, is a random number that undergoes no evaluation for further modification. The reader should understand that other methods of random flow modification may be used as well. For terminal units that are set as a percentage of the maximum flow through the terminal unit, the random and modified random air flows may be computed as a percentage of the dynamic range that is added to the minimum air flow so that the resulting air flow rate lies between a minimum and maximum air flow for the terminal unit.

In the exemplary method of FIG. 4, six test vectors are defined for each test fan speed and the test fan speeds may be set, for example, at rates of 30 cubic feet per minute to 70 cubic feet per minute (CPM) in increments of 10 CPM. In this example, six test vectors are defined for five fan speeds so there are 30 test vectors. An additional test vector for operating the fan speed at 50% of its maximum output rate while all of the terminal units are commanded open may also be added to the test vector set.

After the test vectors are defined, the test vector array is provided to test program generator 54 so a test program may be generated (block 180). In the exemplary method of FIG. 4, the test program is written in PPCL, which is the programming language for terminal units and fan controllers that communicate on an Insight network as is well known in the art, although other controller languages may be generated from the test vectors. The test program may be stored in a file (block 184) for transfer to a building so that the program may be installed in the control system for a building system.

Figure 6:
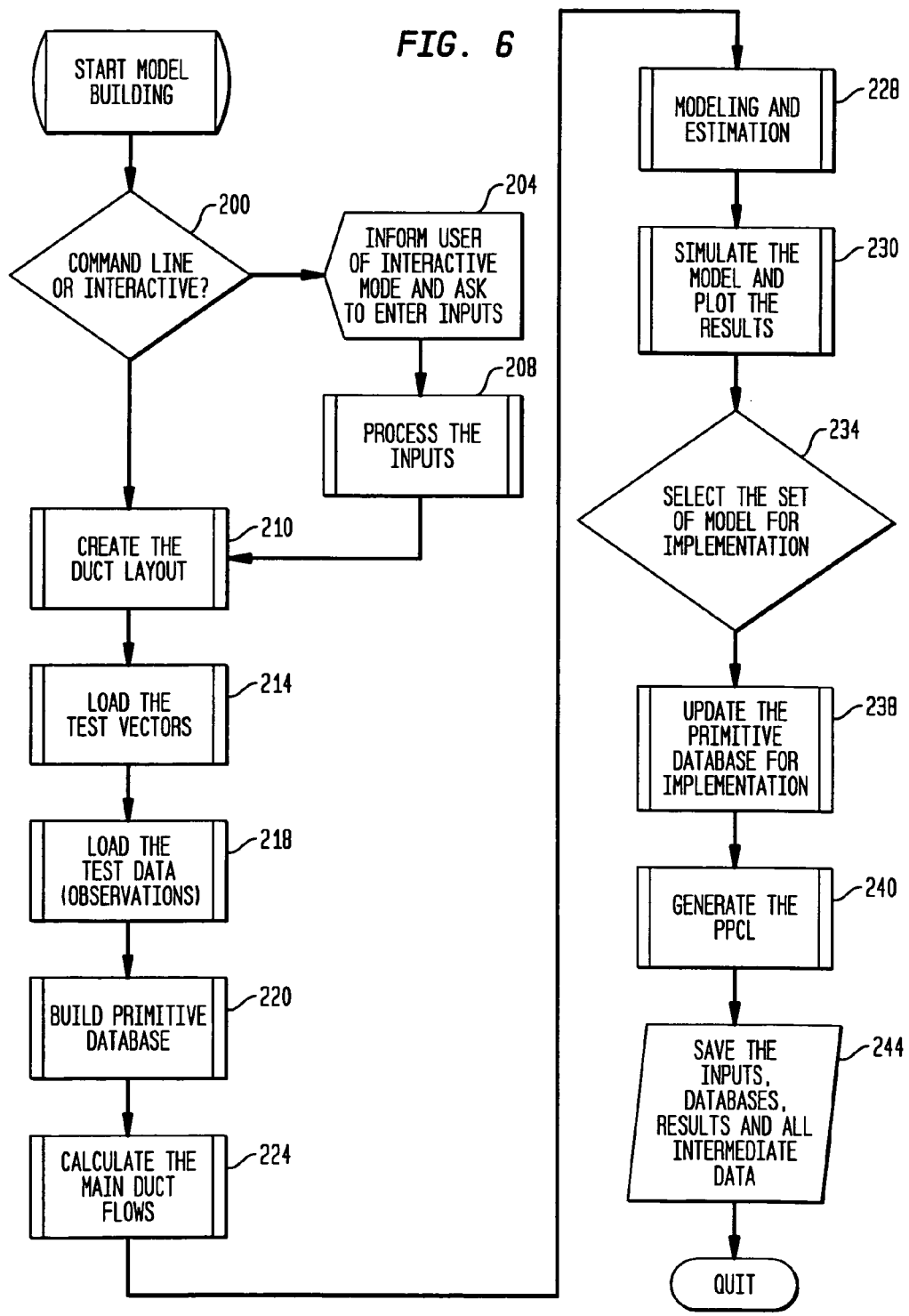
FIG. 6 is a flow chart of an exemplary method for using test results to model and simulate a building system.

After the test program is installed and executed on the control system (block 114, FIG. 3) and the response data captured (block 118, FIG. 3), the data may be filtered for extraneous character data and the like (block 120, FIG. 3) before being used by loss coefficient generator 58. The model estimation (block 124) and simulation (block 128) methods are shown in greater detail in FIG. 6. After determining whether a user wants to enter data, such as building system identification, interactively (block 200), loss coefficient generator 58 either processes a command line or entered data (blocks 204–208) so it is able to locate data files. The duct layout that was previously generated from the one-line diagram and configuration data is retrieved and used to generate a duct layout (block 210). The test vectors previously generated are also retrieved (block 214). The captured test data are read so the terminal unit flows and static supply pressures may be extracted (block 218). From these data, a database may be organized (block 220). The main duct flows are computed (block 224) and these data are used to compute the loss coefficients so the modeling equations may be generated (block 228). The modeling equations may then be used to simulate the building system so that the response of the modeled system may be computed and plotted (block 230). A user may then select the modeling equations that best represent the building system (block 234) and the database is updated with the loss coefficients and other modeling data for simulating the building system (block 238). From these data, a new control program may be generated (block 240). The modeling data may be stored for future reference and the control program stored for transfer and installation at the building system (block 244).

Figure 7:
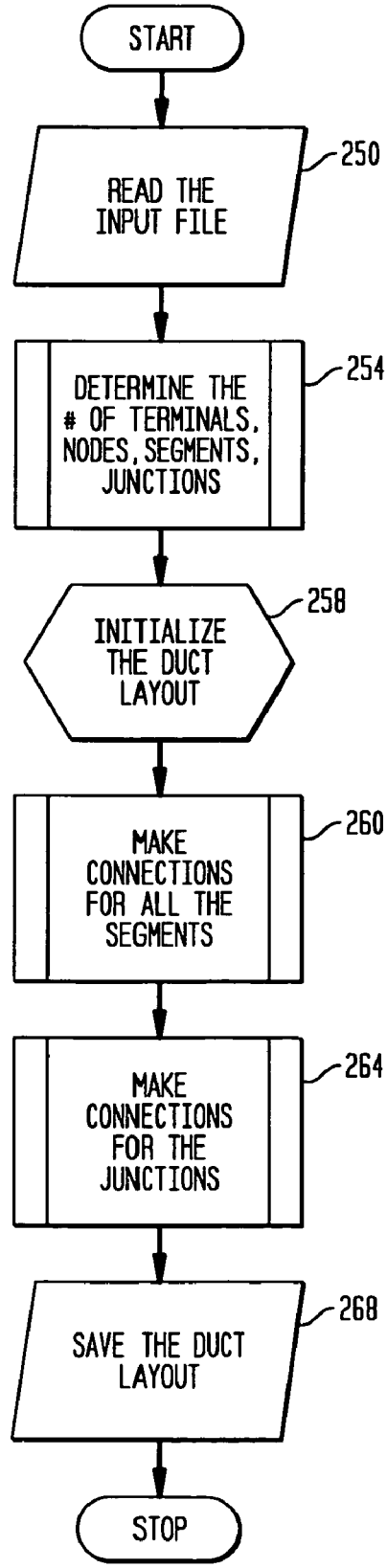
FIG. 7 is a flow chart of an exemplary method for generating a duct layout in accordance with the principles of the present invention.

The duct layout process (block 210, FIG. 6) is shown in more detail in FIG. 7. The process reads the one-line diagram previously generated by test vector/test program generator 54 (block 250). From this file, the number of terminal units, nodes, duct segments, and junctions may be read (block 254) and the duct layout matrix initialized (block 258). The matrix is then populated with indicators of connections between duct segments (block 260) as well as connections between junctions (block 264). The generated matrix representing the duct layout is then stored (block 268).

Figure 8:
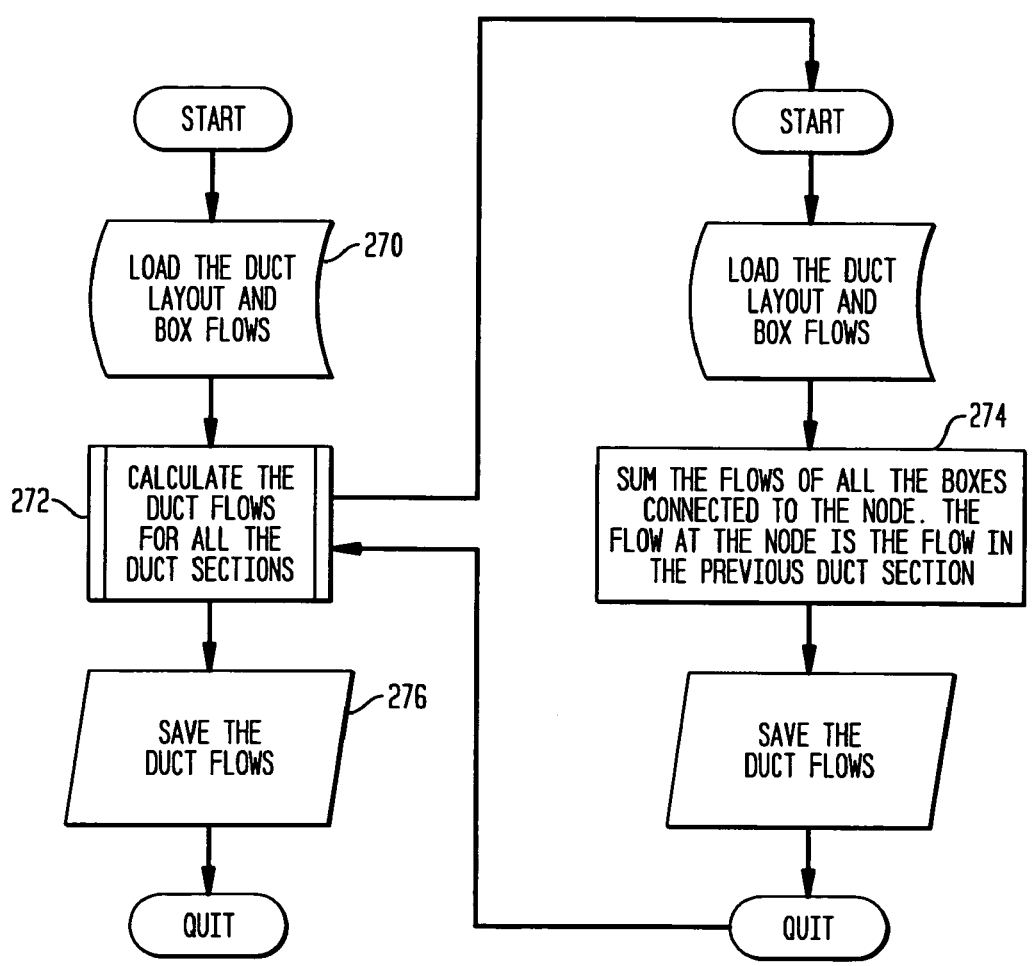
FIG. 8 is a flow chart of an exemplary method for calculating duct segment flows.

The calculation of main duct flows (block 224, FIG. 6) is shown in more detail in FIG. 8. After the duct layout and terminal unit flows are obtained from the database (block 270), the duct flows are computed (block 272). These computations are obtained by subtracting the flows through the terminal units coupled to a node from the flow obtained at the node from the previous duct segment (block 274). This difference is the flow that continues through the duct segment leaving the node that enters the next node. In this manner, the flow through each main duct segment may be obtained. These computed duct flows may be stored for later use (block 276).

Figure 9:
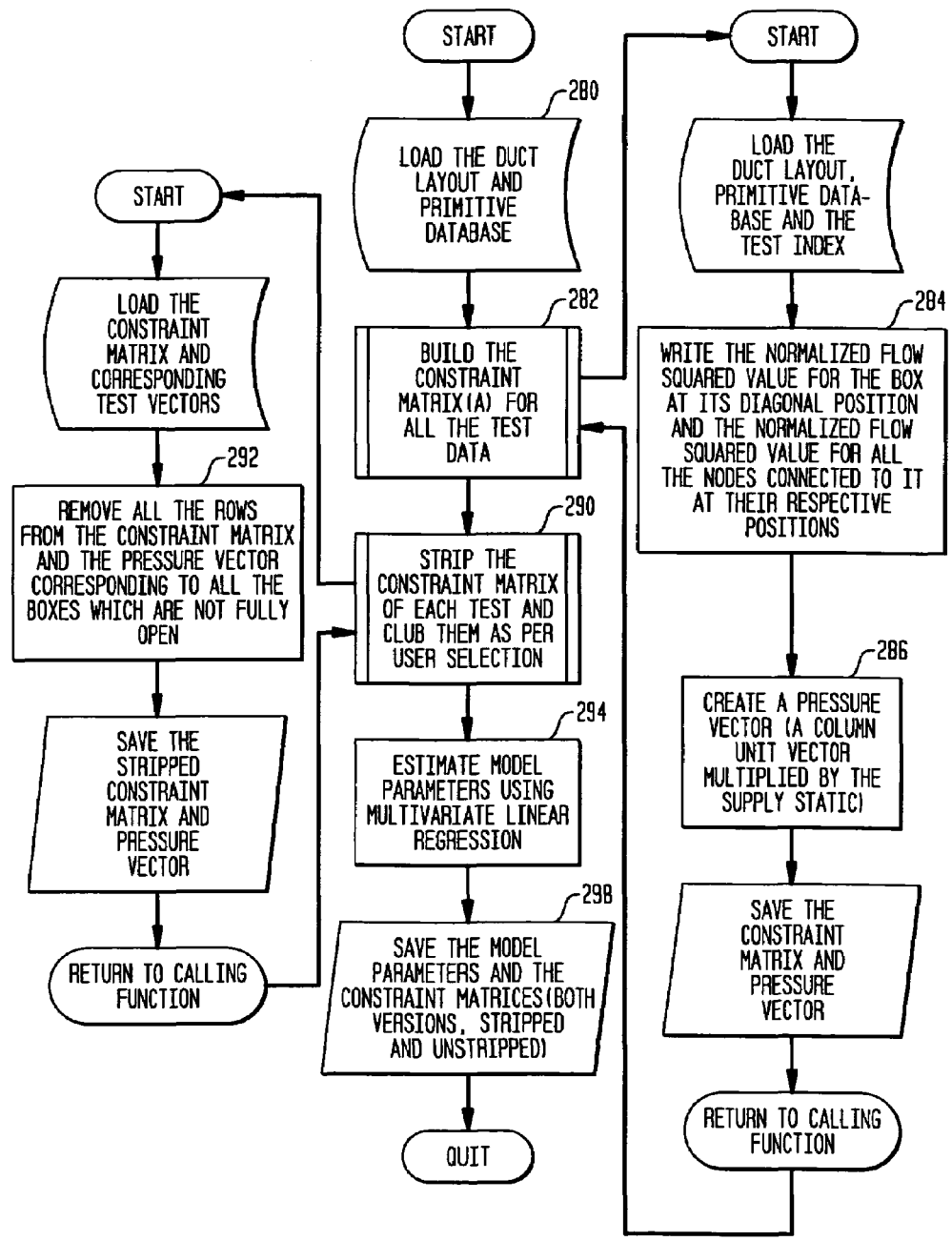
FIG. 9 is a flow chart of an exemplary method for generating loss coefficients for building system modeling equations.

The process for generating the matrices used to compute the loss coefficients and for computing the loss coefficients is shown in more detail in FIG. 9. Using the duct layout and database (block 280), the process builds a constraint matrix and a forcing function matrix (block 282). These matrices are built by reading the flow through a terminal unit and storing the normalized flow squared value ($1/Q^2$) computed from it at the position of the terminal unit on the main diagonal of the constraint matrix (block 284). A column matrix is generated by multiplying a column unit vector with the supply static pressures in the test results file (block 286). The process then continues by stripping the constraint matrix and pressure vector (block 290). The stripping is comprised of the rows from the constraint matrix and pressure vector that do not contain a fully opened terminal unit (block 292). Using multivariate regression analysis with the constraint matrix and pressure vector, the loss coefficients are generated (block 294). The constraint matrices, pressure vectors, and loss coefficients are stored for later reference (block 298). Preferably, both the stripped and non-stripped versions of the matrices and pressure vectors are stored.

Figure 10:
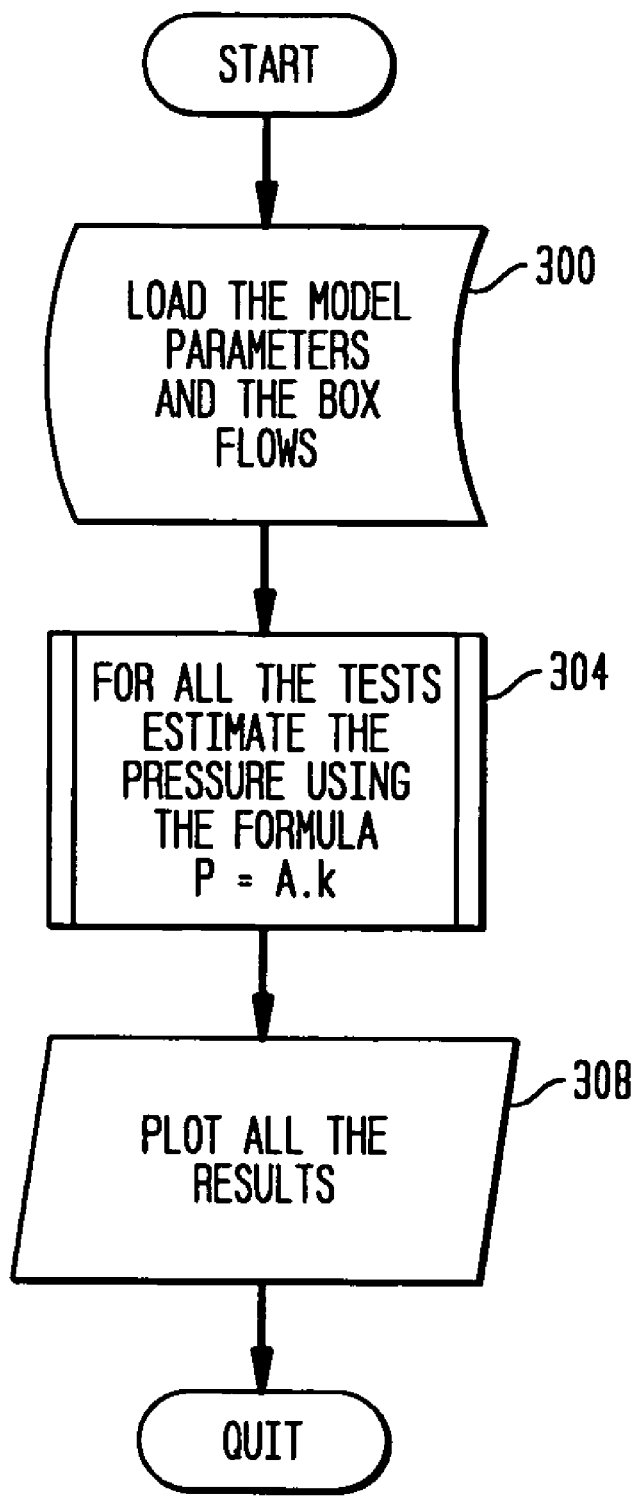
FIG. 10 is a flow chart of an exemplary method for simulating a building system using modeling equations having the loss coefficients generated by the method shown in FIG. 9.

The system simulation (block 128, FIG. 3) is shown in greater detail in FIG. 10. The process uses the computed loss coefficients in the modeling equations and the measured flows through the terminal units (block 300) to compute simulated static pressures (block 304). These simulated pressures may be plotted along with the measured static pressures (block 308) to evaluate the accuracy of the model. If the modeling equations with the computed loss coefficients are deemed adequate for modeling the system, a new control program may be generated for control of the building system.

The system and method of the present invention may be implemented on a computer at a building system site or at a remote location. The configuration and one-line diagram data may be provided to the test vector/test program generator so a test program may be generated for installation and execution on the controllers of a building system. The test program manipulates the terminal units of the building system while the fan is controlled at a constant speed to produce pressure and flow measurements that correspond to independent equations that may be used for computing loss coefficients for the duct segments and terminal units. The computed loss coefficients may be used to update the modeling equations and those equations may be used to simulate the system. Comparison of the simulated static pressures to the actual pressures measured during testing may be used to determine the sufficiency of the modeling equations. If the modeling equations are deemed adequate, a control program is generated from these equations. This program operates the fan at lower static pressures that reduce the consumption of electrical energy. This efficiency is derived, in part, from the determination of loss coefficients based on actual system performance rather than forcing the system to maintain an artificially high static pressure at an arbitrary location approximately two-thirds of the distance from the fan.

While the present invention has been illustrated by the description of exemplary processes and system components, and while the various processes and components have been described in considerable detail, applicants do not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicants' general inventive concept.

What is claimed is:

1. A system for generating a building system test program comprising:
    a test vector generator for generating test vectors corresponding to building system test conditions, the generated test vectors identifying flow rates for at least some terminal units in the building system and the identified flow rates being generated from random numbers mapped to a flow rate within a dynamic range of flow rates for a terminal unit; and
    a building system controller instruction generator for converting the generated test vectors into instructions for operating at least one controller in a building system.

2. The system of claim 1 wherein the random numbers are evaluated for modification before being used to identify a flow rate.

3. A system for generating a building system test program comprising:
    a test vector generator for generating test vectors corresponding to building system test conditions;
    a building system controller instruction generator for converting the generated test vectors into instructions for operating at least one controller in a building system; and
    a loss coefficient generator for generating loss coefficients for modeling equations used to describe the building system.

4. The system of claim 3 wherein the loss coefficient generator generates a duct layout for the building system.

5. The system of claim 3 wherein the loss coefficient generator generates a constraint matrix and a pressure vector for computing loss coefficients.

6. The system of claim 5 wherein regression analysis of the constraint matrix and pressure vector is used to compute the loss coefficients.

7. The system of claim 3 further comprising:
    a building system simulator for simulating building system responses from modeling equations having loss coefficients generated by the loss coefficient generator.

8. A method for generating a building system test program comprising:
    generating test vectors corresponding to building system test conditions, the test vectors identifying flow rates for at least some terminal units in the building system with generated random numbers that are mapped to a flow rate within a dynamic range of flow rates for a terminal unit; and
    converting the generated test vectors into instructions for operating at least one controller in a building system.

9. The method of claim 8 further comprising:
    evaluating the random numbers for modification before being used to identify a flow rate.

10. A method for generating a building system test program comprising:
    generating test vectors corresponding to building system test conditions;
    converting the generated test vectors into instructions for operating at least one controller in a building system; and
    generating loss coefficients for modeling equations used to describe the building system.

11. The method of claim 10 wherein the loss coefficient generation includes generating a duct layout for the building system.

12. The method of claim 10 wherein the loss coefficient generation includes generating a constraint matrix and a pressure vector for computing loss coefficients.

13. The method of claim 12 wherein the loss coefficient generation includes computing the loss coefficients from a regression analysis of the constraint matrix and pressure vector.

14. The method of claim 13 further comprising:
    simulating building system responses from modeling equations having
    loss coefficients generated by the regression analysis of the constraint
    matrix and pressure vector.

15. The method of claim 14 wherein the building system responses simulation is performed with a first group of off-the-shelf programs.

16. The method of claim 15 wherein the loss coefficient generation is performed with a second group of off-the-shelf programs.

17. The method of claim 16 wherein the test vector generation and test vector conversion is performed with a third group of off-the-shelf programs.

18. The method of claim 17 further comprising:
    executing the off-the-shelf programs of the first, second, and third groups
    at a remotely located central platform.

19. The method of claim 18 wherein the off-the-shelf program execution is automatically executed.

* * * * *